United States Patent
Smith et al.

(10) Patent No.: US 8,161,556 B2
(45) Date of Patent: Apr. 17, 2012

(54) CONTEXT-AWARE REAL-TIME COMPUTER-PROTECTION SYSTEMS AND METHODS

(75) Inventors: Spencer Smith, El Segundo, CA (US); Haik Mesropian, Glendale, CA (US)

(73) Assignee: Symantec Corporation, Mountain View, CA (US)

( * ) Notice: Subject to any disclaimer, the term of this patent is extended or adjusted under 35 U.S.C. 154(b) by 456 days.

(21) Appl. No.: 12/336,959

(22) Filed: Dec. 17, 2008

(65) Prior Publication Data

US 2010/0154056 A1  Jun. 17, 2010

(51) Int. Cl.
*G08B 23/00* (2006.01)
*G06F 12/14* (2006.01)

(52) U.S. Cl. .......................................... 726/24

(58) Field of Classification Search ................ 726/22, 726/23, 24
See application file for complete search history.

(56) References Cited

U.S. PATENT DOCUMENTS

| | | | |
|---|---|---|---|
| 5,956,481 A | 9/1999 | Walsh et al. | |
| 7,188,367 B1 * | 3/2007 | Edwards et al. | 726/24 |
| 2003/0120952 A1 * | 6/2003 | Tarbotton et al. | 713/201 |
| 2004/0158730 A1 | 8/2004 | Sarkar | |
| 2005/0108554 A1 * | 5/2005 | Rubin et al. | 713/187 |
| 2005/0132206 A1 | 6/2005 | Palliyil et al. | |
| 2006/0037079 A1 * | 2/2006 | Midgley | 726/24 |
| 2006/0218637 A1 | 9/2006 | Thomas et al. | |
| 2006/0253909 A1 | 11/2006 | Cherepov | |
| 2007/0240217 A1 * | 10/2007 | Tuvell et al. | 726/24 |

OTHER PUBLICATIONS

Balasubramaniyan J S et al., An Architecture for Intrusion Detection using Autonomous Agents, Coast Laboratory, Dec. 7, 1998.
Search Report received in related International Application No. EP-09179149.
Communication from the European Examining Division Received in related European Application No. 09179149.1.

* cited by examiner

*Primary Examiner* — Ellen Tran
(74) *Attorney, Agent, or Firm* — Advantedge Law Group

(57) ABSTRACT

A computer-implemented method for determining, in response to an event of interest, whether to perform a real-time file scan by examining the full context of the event of interest may comprise: 1) detecting an event of interest, 2) identifying at least one file associated with the event of interest, 3) accessing contextual metadata associated with the event of interest, 4) accessing at least one rule that comprises criteria for determining, based on the event of interest and the contextual metadata, whether to perform a security scan on the file, and then 5) determining, by applying the rule, whether to perform the security scan on the file. Corresponding systems and computer-readable media are also disclosed.

19 Claims, 4 Drawing Sheets

CONTEXT-AWARE REAL-TIME COMPUTER-PROTECTION SYSTEMS AND METHODS

BACKGROUND

Performance is a continual concern for the vendors of real-time security products, such as real-time file-scanning solutions. Traditional real-time file-scanning solutions typically: 1) detect when a file has been opened or modified and then 2) determine, by scanning the file in question, whether the file has been compromised. While a single file scan may not overly tax the resources of a computing system, the number of file operations performed by modern-day operation systems may necessitate an inordinate number of file scans, which may in turn lead to visibly slower computing-system performance and user frustration.

Although some security vendors have attempted to limit the performance impact of real-time file-scanning solutions by skipping the scanning of files based on a file's extension or based on whether a file is opened or closed, such conventional approaches are limited in effectiveness and reliability. For example, such approaches may fail to identify malicious files that have file extensions that appear to be legitimate. Similarly, such approaches may devote computing resources to scanning a modified file, even if there is a high likelihood that the modified file was not compromised. As such, the instant disclosure identifies a need for improving both the performance and reliability of traditional real-lime file-scanning security solutions.

SUMMARY

As will be described in greater detailed below, the instant disclosure generally relates to systems and methods for determining, in response to an event of interest (such as when a file is opened or closed or when a vendor-supplied virus definition set is updated), whether to perform a real-time file scan by examining the full context of the event of interest. The full context of the event of interest may include the history of the file in question, the history of the application accessing the file in question, and known acceptable usage patterns for the file in question. By evaluating this information rather than always performing a scan, the systems and methods disclosed herein may minimize the performance impact of a real-time scanning system without significantly lowering the level of security provided by traditional real-time scanning solutions.

For example, a system may determine whether to perform a real-time file scan by: 1) detecting an event of interest (such as when a file is opened or closed or when a vendor-supplied virus definition set is updated), 2) identifying at least one file associated with the event of interest (such as the file that was opened or closed), 3) accessing information that describes or identifies the larger context within which the event of interest takes place (also referred to herein as "contextual metadata"), 4) accessing at least one rule that contains criteria for determining, based on the event of interest and the contextual metadata, whether to perform a scan on the file, and then 5) determining, by applying the rule, whether to perform the scan on the file.

If the system decides to scan the file, the system may also determine, based on the contextual metadata, whether to increase or decrease the level of scrutiny to be applied to the file when performing the scan. The system may also determine, based on the results of the scan, whether to block the file, quarantine the file, delete the file, notify a user or security vendor, or the like. The system may then update the contextual metadata based on the results of the security scan.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
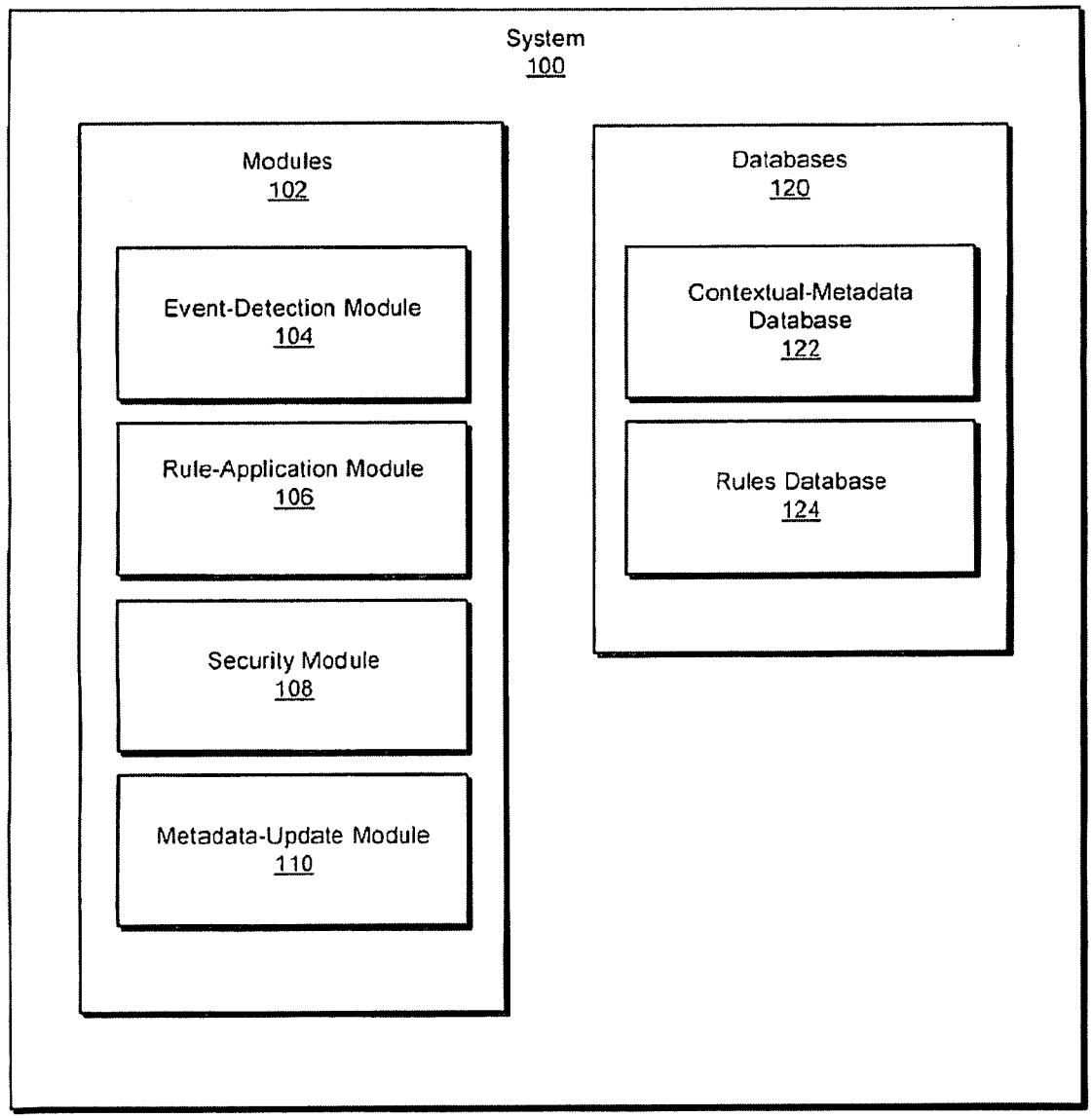
FIG. 1 is a block diagram of an exemplary system for determining, in response to an event of interest, whether to perform a real-time file scan by examining the full context of the event of interest.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detailed below, the instant disclosure generally relates to systems and methods for determining, in response to an event of interest, whether to perform a real-time file scan by examining the full context of the event of interest. Information that describes or identifies the larger context within which an event of interest takes place (hereafter "contextual metadata") may include, without limitation, information about the file in question (such as the file's name, the file's creation date, the number of times the file has been read or modified, applications that have read or modified the file, typical usage behavior for the file, the results of a prior security scan performed on the file, or the like) or information about applications that touch or are associated with the file in question (such as whether the application is a portal, whether the application generates network activity, whether the application contains a known vulnerability, or the like).

The following will provide, with reference to FIG. 1, a detailed description of an exemplary system for determining, in response to an event of interest, whether to perform a real-time file scan by examining the full context of the event of interest. A detailed description of a corresponding exemplary computer-implemented method will also be provided in connection with FIG. 2. In addition, descriptions of an exemplary computing system and network architecture capable of implementing one or more of the embodiments described and/or illustrated herein will also be provided in connection with FIGS. 3 and 4.

FIG. 1 is a block diagram of an exemplary system 100 for determining, in response to an event of interest, whether to perform a real-time file scan by examining the full context of the event of interest. As illustrated in this figure, exemplary system 100 may comprise one or more modules 102 for performing one or more tasks. For example, exemplary system 100 may comprise an event-detection module 104 for detecting events of interest (such as when a file is opened or closed or when a vendor-supplied virus definition set is updated) that may trigger file scans. Exemplary system 100 may also comprise a rule-application module 106 for accessing and applying rules that contain criteria for determining, based on the detected event of interest and contextual metadata associated with the event of interest, whether to perform a file scan.

In addition, exemplary system 100 may comprise a security module 108 for performing security scans on files to determine whether the files are malicious or otherwise pose security risks. Exemplary system 100 may also comprise a metadata-update module 110 for updating, based on the results of a security scan of a file, the contextual metadata. Although not illustrated in FIG. 1, exemplary system 100 may also comprise one or more additional modules.

In certain embodiments, one or more of modules 102 in FIG. 1 may represent one or more software applications or programs that, when executed by a computing device, may cause the computing device to determine, in response to an event of interest, whether to perform a real-time file scan by examining the full context of the event of interest. For example, as will be described in greater detail below, one or more of modules 102 may represent software modules configured to run on one or more computing devices, such as computing system 310 in FIG. 3 and/or portions of exemplary network architecture 400 in FIG. 4. One or more modules 102 in FIG. 1 may also represent all or portions of one or more special-purpose computers configured to perform one or more tasks.

As illustrated in FIG. 1, exemplary system 100 may also comprise one or more databases 120. Databases 120 may represent portions of a single database or computing device or a plurality of databases or computing devices. In one embodiment, exemplary system 100 may comprise a contextual-metadata database 122 for storing contextual metadata, such as information about files that are candidates for scanning and information about applications that touch or are associated with the candidate files. Exemplary system 100 may also comprise a rules database 124 for storing rules or rule sets that contain criteria for determining, based on characteristics of a program, whether the program comprises a spam program.

One or more of databases 120 in FIG. 1 may represent a portion of one or more computing devices. For example, one or more of databases 120 may represent a portion of computing system 310 in FIG. 3 and/or portions of exemplary network architecture 400 in FIG. 4. Alternatively, one or more of databases 120 in FIG. 1 may represent one or more physically separate devices capable of being accessed by a computing device, such as computing system 310 in FIG. 3 and/or portions of exemplary network architecture 400 in FIG. 4.

Figure 2:
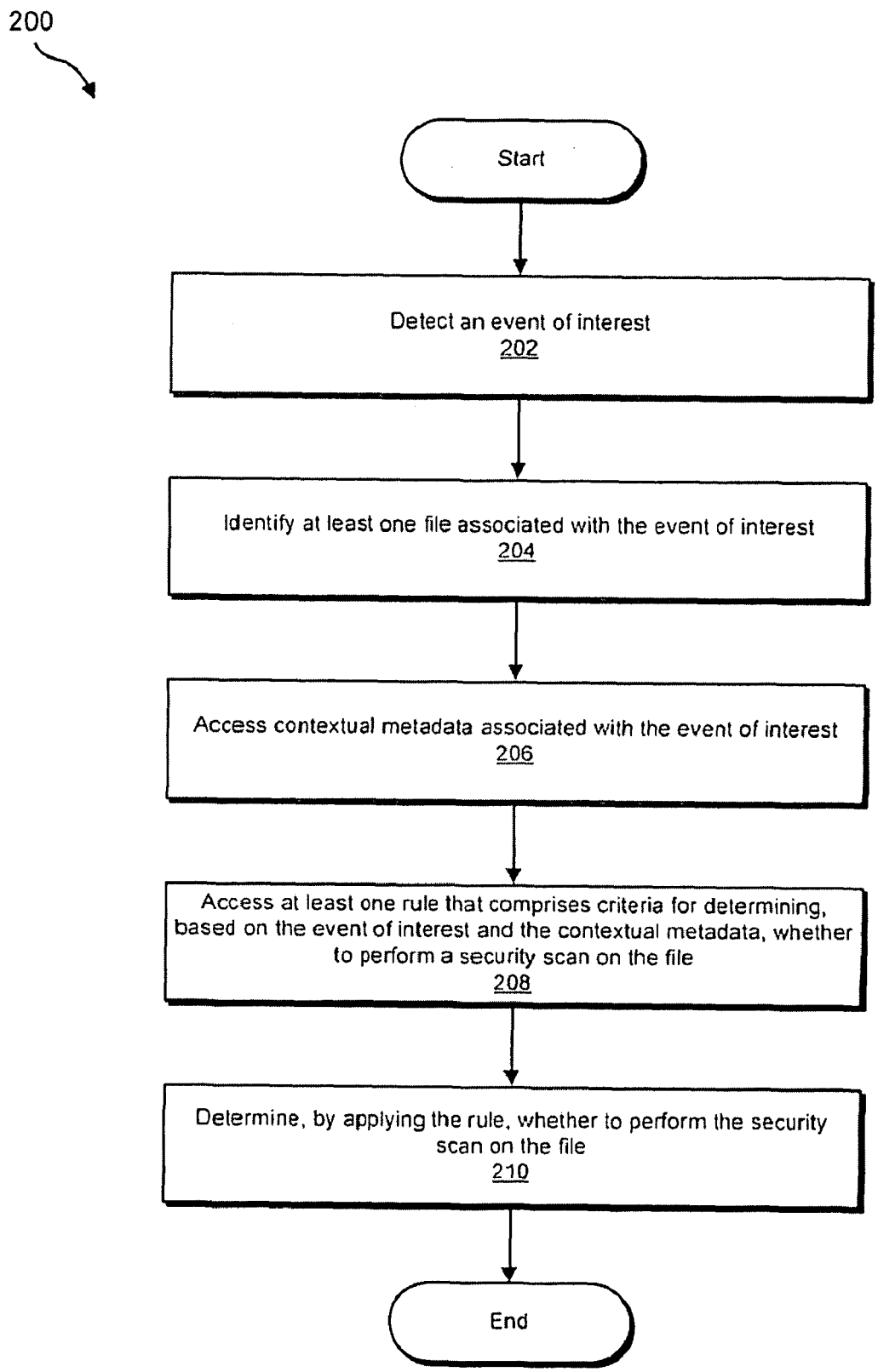
FIG. 2 is a flow diagram of an exemplary method for determining, in response to an event of interest, whether to perform a real-time file scan by examining the full context of the event of interest.

FIG. 2 is a flow diagram of an exemplary computer-implemented method 200 for determining, in response to an event of interest, whether to perform a real-time file scan by examining the lull context of the event of interest. As illustrated in this figure, at step 202 the system may detect an event of interest. For example, event-detection module 104 in FIG. 1 may detect an event of interest on computing system 310 in FIG. 3.

The phrase "event of interest," as used herein, generally refers to any event on a computing system that may trigger a file scan. Examples of events of interest include, without limitation, a failed or successful attempt by a process or application to open a file, a failed or successful attempt by a process or application to close a file, updates to security-vendor-supplied virus definition sets, or any other event that may call into question the trust worthiness of a file on a computing system.

The system may perform step 202 in a variety of ways. In one example, event-detection module 104 in FIG. 1 may detect events of interest by hooking into an operating system of a computing system (such as computing system 310 in FIG. 3) and responding to specific events.

At step 204, the system may identify at least one file associated with the event of interest detected in step 202. The system may identify files that are associated with events of interest in a variety of ways. For example, if, in step 202, event-detection module 104 identifies a successful attempt by a process to open a file, then at step 204 event-detection module 104 may identify the file that was opened. Alternatively, if, at step 202, event-detection module 104 detects an update to a vendor-supplied virus definition set, then at step 204 event-detection module 104 may identify one or more files that are affected or impacted by this update.

At step 206, the system may access contextual metadata associated with the event of interest. For example, rule-application module 106 in FIG. 1 may retrieve information about the file identified in step 204 from contextual-metadata database 122 in FIG. 1.

As detailed above, the phrase "contextual metadata" may refer to information about the larger context in which an event of interest takes place. Examples of contextual metadata may include, without limitation, information about the file in question and information about one or more applications that touch or are associated with the file in question. Examples of the types of information about files that may be included in contextual metadata include, without limitation, the file's name, the file's pathname, the file's type (such as whether the file is a prefetch file, whether the file is a log file, or the like), the file's creation date, the file's last-modified date, a hash or digital signature for the file, the number of times the file has been read or modified, applications that have read or modified the file, usage behavior for the file (such as whether the file is typically opened during boot sequence), the results of a prior security scan performed on the file, or any other information that may be useful in determining whether to perform a security scan on the file.

Similarly, exemplary information about applications that touch or are associated with candidate files may include, without limitation, the application's name, processes associated with the application, usage behavior for the application, whether the application is a portal, whether the application generates network activity, whether the application contains a known vulnerability, or any other information that may be useful in determining whether to perform a security scan on the file in question.

At step 208, the system may access at least one rule that comprises criteria for determining, based on the event of interest and the contextual metadata, whether to perform a security scan on the file. For example, rule-application module 106 in FIG. 1 may retrieve at least one rule from rules database 124 that contains criteria for determining whether to perform a security scan on the file identified in step 204.

At detailed above, the rule or rules accessed in step 208 may comprise criteria for determining whether an event of interest (such as an application's successful attempt to open and modify a file) necessitates a real-time file scan. Examples of criteria that may be used by rules to determine whether to perform a real-time scan on a file include, without limitation, the name of the file in question, the name of the process or application that modified, read, or otherwise accessed the file in question, the pathname or location of the file in question, the file type of the file in question, the creation date or last-modified date for the file in question, the number of times the file in question has been accessed, applications or processes that have accessed the file in question, acceptable usage behavior for the file in question, acceptable usage behavior for the application attempting to access the file in question, the results of a prior security scan performed on the file in question, whether the application attempting to access the file in question is a portal, whether the application attempting to access the file in question generates network activity, whether the application attempting to access the file in question contains a known vulnerability, or any other criteria that may be used to determine whether an event of interest may necessitate a real-time scan of the file.

For example, a rule may stipulate that a specific file (identified, for example, by filename or pathname) need not be scanned so long as the file is accessed by certain pre-approved applications or processes (identified, for example, by process name). Similarly, a rule may stipulate that certain sensitive or critical system files (identified, for example, by their file type or pathname) must be scanned whenever these files are modified by applications that have known vulnerabilities.

Rules may be generic or specific in nature. For example, a generic rule may be written to eliminate scans in non-threatening use cases. For example, a rule may stipulate that a file that has only been written to, and never read (such as a log file), need not be scanned after the file has been closed following a write operation. Similarly, a generic rule may stipulate that, if a file has only been written to or read from by a single application over the course of X number of days, then the file need not be scanned so long as the file is accessed by the single identified application.

Rules may also be written for specific file types. For example, a rule may stipulate that if a process or application accesses a WINDOWS prefetch file, then the prefetch file should only be scanned if the file's name does not match the process' name. In this example, the rule may stipulate that a prefetch file should not be scanned if: 1) the file's name is "IEXPLORE.EXE-XXXXXX.PF," 2) the file is being read by the process "IEXPLORE.EXE," and 3) the host process has just started.

Rules may also be application-specific in nature. For example, a rule may be created for a specific application that stipulates that temporary files created by the application in certain well-known locations need not be scanned since these temporary files will be deleted when the application terminates. In each of the above examples, rules may be developed by comparing the security risk associated with skipping or reducing a scan in that scenario with the performance improvement that may be realized.

In certain examples, rules may also comprise criteria for determining, based on the contextual metadata associated with the event of interest, a level of security to be applied to the file when performing the security scan. For example, a rule may stipulate that when a file is opened by a pre-approved application, then the system need only perform a limited security scan (by, for example, determining whether a portion of the file matches at least one signature within a virus-definition set supplied by a security vendor) on the file. Alternatively, if the system determines that the file is accessed by a new or unapproved application, then the system may perform a full scan on the file (by, for example, executing the file within a virtual or emulated computing environment to determine whether the file contains malicious payload).

At step 210, the system may determine, by applying the rule from step 208, whether to perform a security scan on the file. For example, rule-application module 106 in FIG. 1 may apply the rule retrieved from rules database 124 in step 208 to the file identified in step 204. Upon completion of step 210 in FIG. 2, exemplary method 200 in FIG. 2 may terminate.

If rule-application module 106 in FIG. 1 determines, in step 210, that the system should perform a security scan on the file, then security module 108 may perform a security scan on the file. As used herein, the phrase "security scan" generally refers to any analysis performed by a computing system on a file in order to determine whether the file is malicious or otherwise represents a security risk.

Security module 108 in FIG. 1 may attempt to determine whether a file is malicious in a variety of ways. For example, security module 108 may: 1) determine whether at least a portion of the file matches at least one signature within a virus-definition set supplied by a security vendor (e.g., by comparing the file's hash with hashes for known malicious files), 2) determine whether the file triggers a malware-detection heuristic supplied by a security vendor (e.g., by pattern matching), 3) execute the file within a virtual or emulated computing environment to determine whether the file contains malicious payload, or 4) verify the legitimacy of the file through any other suitable means.

Depending on the results of the security scan, security module 108 may also perform a security operation on the file. The phrase "security operation," as used herein, generally refers to any security operation that may be performed on a known malicious file. Examples of security operations include, without limitation, deleting the file, blocking access to a file, quarantining a file, transmitting a notification to a user or security vendor that identifies the file as a security risk, or any other security operation that may be performed on malicious files or files that are known to pose security risks.

In certain embodiments, upon completing the security scan, the system may update the contextual metadata accessed in step 206 based on the results of the scan. For example, metadata-update module 110 in FIG. 1 may update the contextual metadata stored in contextual-metadata database 122 with the results of a security scan performed on a file.

As detailed above, by developing and applying rules that take into account the larger context of an event of interest, the systems and methods described herein may improve the performance of a real-time scanning system without significantly sacrificing the level of security provided. As such, the systems and methods disclosed herein may provide various reliability and performance advantages to users of real-time computer-security solutions.

Figure 3:
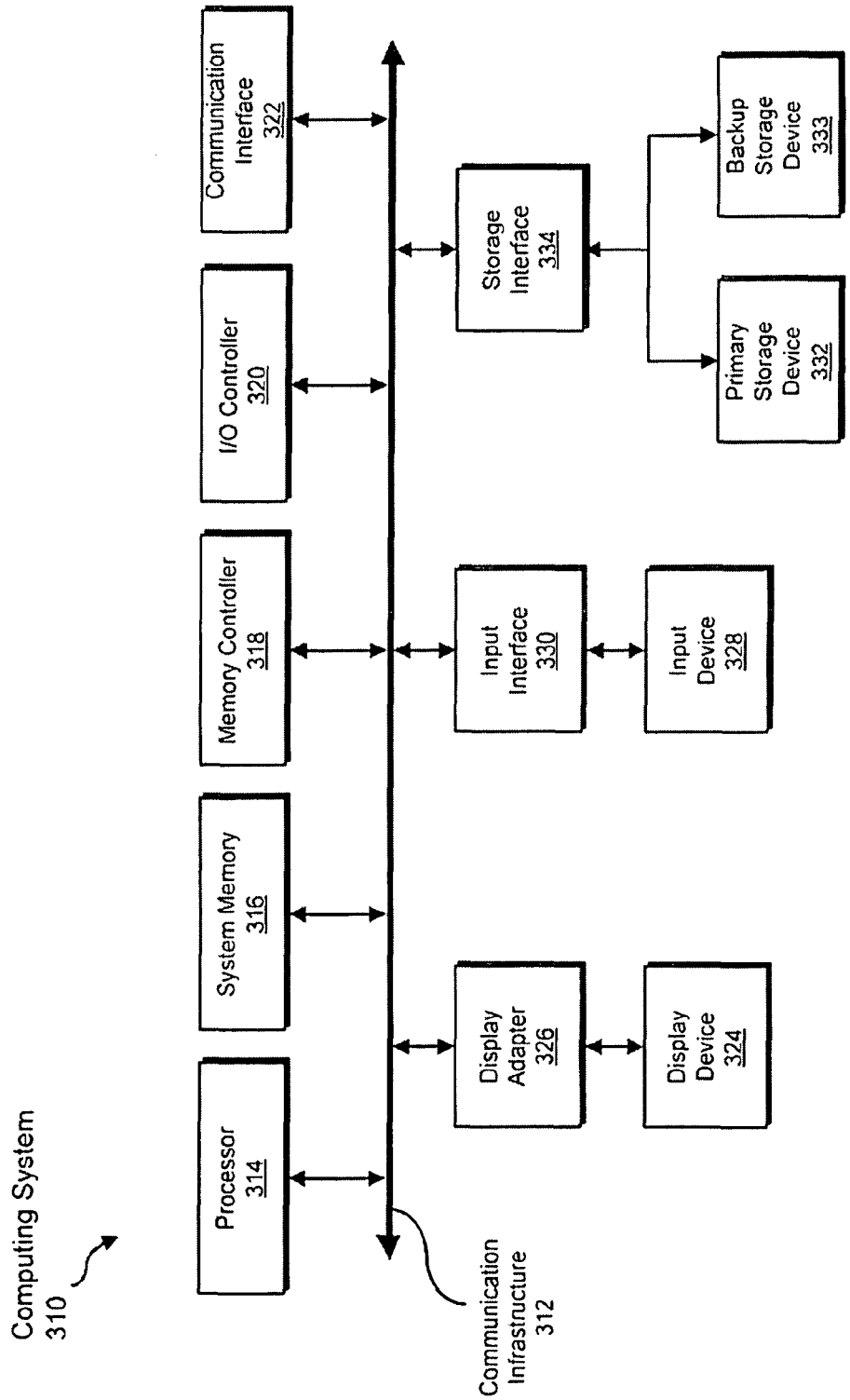
FIG. 3 is a block diagram of an exemplary computing system capable of implementing one or more of the embodiments described and/or illustrated herein.

FIG. 3 is a block diagram of an exemplary computing system 310 capable of implementing one or more of the embodiments described and/or illustrated herein. Computing system 310 broadly represents any single or multi-processor computing device or system capable of executing computer-readable instructions. Examples of computing system 310 include, without limitation, workstations, laptops, client-side terminals, servers, distributed computing systems, handheld devices, or any other computing system or device. In its most basic configuration, computing system 310 may comprise at least one processor 314 and a system memory 316.

Processor 314 generally represents any type or form of processing unit capable of processing data or interpreting and executing instructions. In certain embodiments, processor 314 may receive instructions from a software application or module. These instructions may cause processor 314 to perform the functions of one or more of the exemplary embodiments described and/or illustrated herein. For example, processor 314 may perform and/or be a means for performing, either alone or in combination with other elements, one or more of the detecting, identifying, accessing, applying, opening, closing, retrieving, performing, blocking, quarantining, transmitting, updating, and executing steps described herein. Processor 314 may also perform and/or be a means for performing any other steps, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may comprise both a volatile memory unit (such as, for example, system memory 316) and a non-volatile storage device (such as, for example, primary storage device 332, as described in detail below).

In certain embodiments, exemplary computing system 310 may also comprise one or more components or elements in addition to processor 314 and system memory 316. For example, as illustrated in FIG. 3, computing system 310 may comprise a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an ISA, PCI, PCIe, or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the steps or features described and/or illustrated herein, such as detecting, identifying, accessing, applying, opening, closing, retrieving, performing, blocking, quarantining, transmitting, updating, and executing.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage detecting, identifying, accessing, applying, opening, closing, retrieving, performing, blocking, quarantining, transmitting, updating, and executing steps described herein. I/O controller 320 may also be used to perform and/or be a means for performing other steps and features set forth in the instant disclosure.

Communication interface 322 broadly represents any type or form of communication device or adapter capable of facilitating communication between exemplary computing system 310 and one or more additional devices. For example, in certain embodiments communication interface 322 may facilitate communication between computing system 310 and a private or public network comprising additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network or a wireless IEEE 802.11 network), a personal area network (such as a BLUETOOTH network or an IEEE 802.15 network), a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 322 may also allow computing system 310 to engage in distributed or remote computing. For example, communication interface 322 may receive instructions from a remote device or send instructions to a remote device for execution. In certain embodiments, communication interface 322 may perform and/or be a means for performing, either alone or in combination with other elements, one or more of the detecting, identifying, accessing, applying, opening, closing, retrieving, performing, blocking, quarantining, transmitting, updating, and executing steps disclosed herein. Communication interface 322 may also be used to perform and/or be a means for performing other steps and features set forth in the instant disclosure.

As illustrated in FIG. 3, computing system 310 may also comprise at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, exemplary computing system 310 may also comprise at least one input device 328 coupled to communication infrastructure 312 via an input interface 330. Input device 328 generally represents any type or form of input device capable of providing input, either computer or human generated, to exemplary computing system 310. Examples of input device 328 include, without limitation, a keyboard, a pointing device, a speech recognition device, or any other input device. In at least one embodiment, input device 328 may perform and/or be a means for performing, either alone or in combination with other elements, one or more of the detecting, identifying, accessing, applying, opening, closing, retrieving, performing, blocking, quarantining, transmitting, updating, and executing steps disclosed herein. Input device 328 may also be used to perform and/or be a means for performing other steps and features set forth in the instant disclosure.

As illustrated in FIG. 3, exemplary computing system 310 may also comprise a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may be a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also comprise other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

In certain embodiments, the exemplary file systems disclosed herein may be stored on primary storage device 332, while the exemplary file-system backups disclosed herein may be stored on backup storage device 333. Storage devices 332 and 333 may also be used, for example, to perform and/or be a means for performing, either alone or in combination with other elements, one or more of the detecting, identifying, accessing, applying, opening, closing, retrieving, performing, blocking, quarantining, transmitting, updating, and executing steps disclosed herein. Storage devices 332 and 333 may also be used to perform and/or be a means for performing other steps and features set forth in the instant disclosure.

Many other devices or subsystems may be connected to computing system 310. Conversely, all of the components and devices illustrated in FIG. 4 need not be present to practice the embodiments described and/or illustrated herein. The devices and subsystems referenced above may also be interconnected in different ways from that shown in FIG. 3. Computing system 310 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 310 may be configured as an application specific integrated circuit (ASIC) adapted to implement one or more of the exemplary embodiments disclosed herein.

Figure 4:
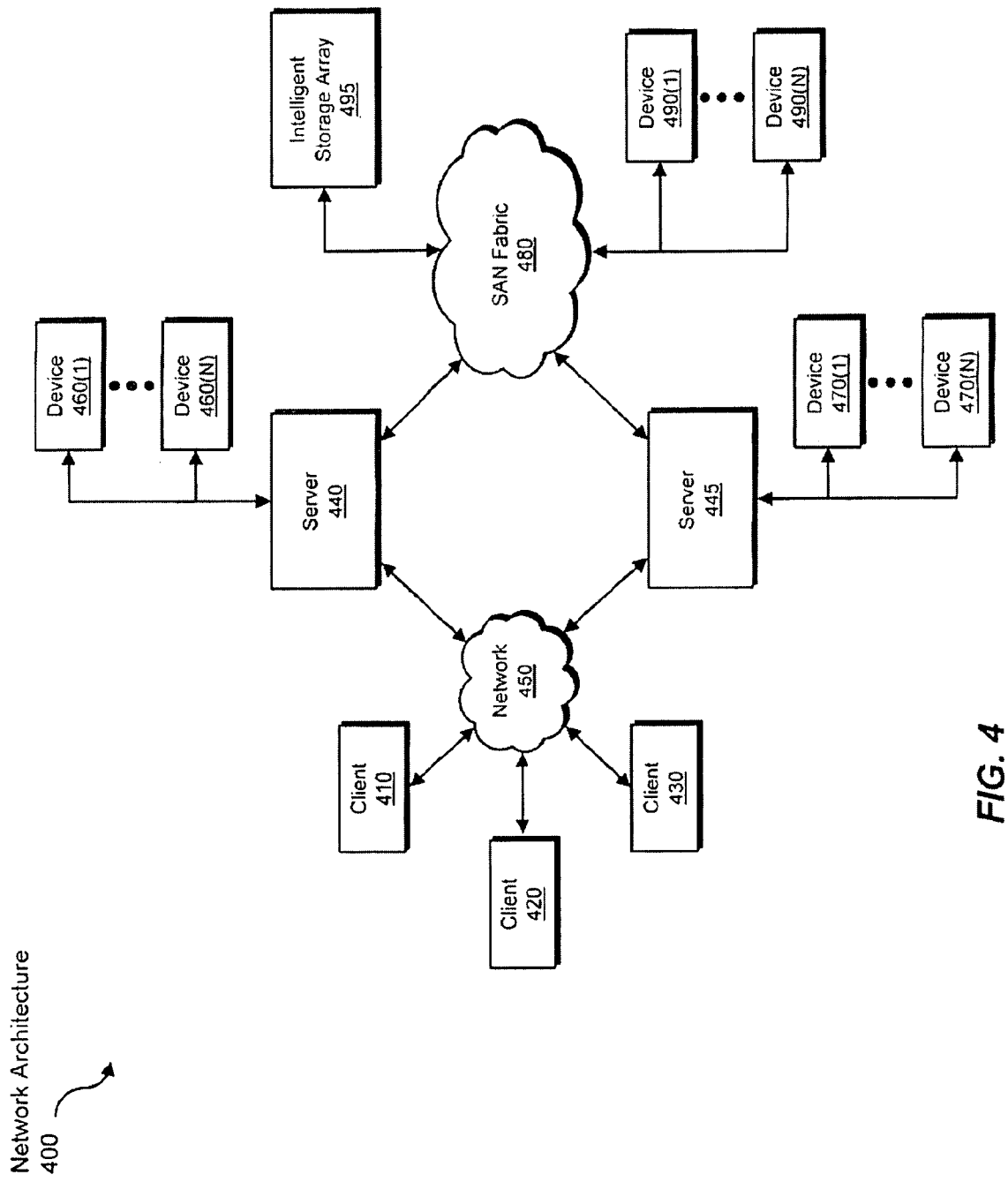
FIG. 4 is a block diagram of an exemplary computing network capable of implementing one or more of the embodiments described and/or illustrated herein.

FIG. 4 is a block diagram of an exemplary network architecture 400 in which client systems 410, 420, and 430 and servers 440 and 445 may be coupled to a network 450. Client systems 410, 420, and 430 generally represent any type or form of computing device or system, such as exemplary computing system 310 in FIG. 3. Similarly, servers 440 and 445 generally represent computing devices or systems, such as application servers or database servers, configured to provide various database services and/or to run certain software applications. Network 450 generally represents any telecommunication or computer network; including, for example, an intranet, a wide area network (WAN), a local area network (LAN), a personal area network (PAN), or the Internet.

As illustrated in FIG. 4, one or more storage devices 460(1)-(N) may be directly attached to server 440. Similarly, one or more storage devices 470(1)-(N) may be directly attached to server 445. Storage devices 460(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as NFS, SMB, or CIFS.

Servers 440 and 445 may also be connected to a storage area network (SAN) fabric 480. SAN fabric 480 generally represents any type or form of computer network or architecture capable of facilitating communication between a plurality of storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 460(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to exemplary computing system 310 of FIG. 3, a communication interface, such as communication interface 322 in FIG. 3, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 460(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 440, server 445, storage devices 460(1)-(N), storage devices 470(1)-(N), storage devices 490(1)-(N), intelligent storage array 495, or any combination thereof. All or a portion of one or more of the exemplary embodiments disclosed herein may also be encoded as a computer program, stored in server 440, run by server 445, and distributed to client systems 410, 420, and 430 over network 450. Accordingly, network architecture 400 may perform and/or be a means for performing, either alone or in combination with other elements, one or more of the detecting, identifying, accessing, applying, opening, closing, retrieving, performing, blocking, quarantining, transmitting, updating, and executing steps disclosed herein. Network architecture 400 may also be used to perform and/or be a means for performing other steps and features set forth in the instant disclosure.

As detailed above, one or more of the systems described herein may perform and/or be a means for performing, either alone or in combination with other elements, one or more of the exemplary methods described and/or illustrated herein. For example, the systems described herein may perform a method for determining, based on contextual metadata associated with an event of interest, whether to perform a real-time file scan that comprises: 1) detecting an event of interest, 2) identifying at least one file associated with the event of interest, 3) accessing contextual metadata associated with the event of interest, 4) accessing at least one rule that comprises criteria for determining, based on the event of interest and the contextual metadata, whether to perform a security scan on the file, and then 5) determining, by applying the rule, whether to perform the security scan on the file.

The event of interest may represent an attempt to open the file, an attempt to close the file, or an update to a virus definition set supplied by a security vendor. In addition, the contextual metadata may comprise information about the file and/or information about at least one application associated with the file.

The information about the file may comprise information that identifies the file's name, the file's pathname, the file's type, the file's creation date, the file's last-modified date, a hash of the file, the number of times the file has been read or modified, applications that have read or modified the file, usage behavior for the file, the results of a prior security scan performed on the file, or any other potentially useful information. Similarly, the information about the application associated with the file may comprise the application's name, processes associated with the application, usage behavior for the application, whether the application is a portal, whether the application generates network activity, whether the application contains a known vulnerability, or any other potentially useful information.

The rule may represent a generic file rule, a generic application rule, a file-type-specific rule that identifies acceptable usage behavior for the file, or an application-specific rule that identifies acceptable usage behavior for an application associated with the file. The rule may also comprise criteria for determining, based on the contextual metadata, a level of scrutiny to be applied to the file when performing the security scan.

In some embodiments, accessing the contextual metadata may comprise retrieving the contextual metadata from a contextual-metadata database. Similarly, accessing the rule may comprise retrieving the rule from a rules database. In addition, the method may further comprise performing the security scan on the file and then determining, based on the results of the security scan, whether to perform a security operation on the file. The security operation may represent an operation to block the file, quarantine the file, delete the file, or transmit a notification to a user or security vendor that identifies the file as a security risk.

In certain embodiments, the method may further comprise updating the contextual metadata based on the results of the security scan. In some embodiments, performing the security scan on the file may comprise determining whether a portion of the file matches at least one signature within a virus definition set supplied by a security vendor, determining whether the file triggers a malware-detection heuristic supplied by a security vendor, and/or executing the file within a virtual environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining, in response to an event of interest, whether to perform a real-time file scan by examining the full context of the event of interest, at least a portion of the method being performed by a computing device comprising at least one processor, the method comprising:
   detecting an event of interest;
   identifying at least one file impacted by the event of interest;
   accessing contextual metadata associated with the event of interest, the contextual metadata comprising information that identifies:
      at least one characteristic of the file;
      at least one characteristic of at least one application associated with the file;
   accessing at least one rule that comprises criteria that identifies acceptable usage behavior for files and applications;
   determining, by applying the rule to both the event of interest and the contextual metadata, whether the event of interest satisfies the criteria that identifies acceptable usage behavior for files and applications;
   determining, based on whether the event of interest satisfies the criteria that identifies acceptable usage behavior for files and applications, whether to perform a security scan on the file.

2. The method of claim 1, wherein the characteristic of the file comprises at least one of:
   the file's name;
   the file's pathname;
   the file's type;
   the file's creation date;
   the file's last-modified date;
   a hash of the file;
   the number of times the file has been read;
   the number of times the file has been modified;
   historical usage behavior for the file;
   results of a prior security scan performed on the file.

3. The method of claim 1, wherein the characteristic of the application associated with the file comprises at least one of:
   the application's name;
   processes associated with the application;
   historical usage behavior for the application;
   whether the application is a portal;
   whether the application generates network activity;
   whether the application contains a known vulnerability.

4. The method of claim 1, wherein the contextual metadata further comprises information that indicates the identity of at least one application that has attempted to access the file.

5. The method of claim 1, wherein the rule further comprises criteria for determining, based on both the event of interest and the contextual metadata, a level of scrutiny to be applied to the file when performing the security scan.

6. The method of claim 1, wherein the event of interest comprises at least one of:
   an attempt to open the file;
   an attempt to close the file;
   an update to a virus definition set supplied by a security vendor.

7. The method of claim 1, wherein:
   accessing the contextual metadata comprises retrieving the contextual metadata from a contextual-metadata database;
   accessing the rule comprises retrieving the rule from a rules database.

8. The method of claim 1, further comprising:
   performing the security scan on the file;
   determining, based on results of the security scan, whether to perform a security operation on the file.

9. The method of claim 8, wherein the security operation comprises at least one of:
   blocking the file;
   quarantining the file;
   transmitting a notification that identifies the file as a security risk.

10. The method of claim 8, further comprising updating, based on the results of the security scan, the contextual metadata.

11. The method of claim 8, wherein performing the security scan on the file comprises at least one of:
   determining whether a portion of the file matches at least one signature within a virus definition set supplied by a security vendor;
   determining whether the file triggers a malware-detection heuristic supplied by a security vendor;
   executing the file within a virtual environment.

12. A system for determining, in response to an event of interest, whether to perform a real-time file scan by examining the full context of the event of interest, the system comprising:
   an event-detection module programmed to:
      detect an event of interest;
      identify at least one file impacted by the event of interest;
   a contextual-metadata database containing contextual metadata associated with the event of interest, the contextual metadata comprising information that identifies:
      at least one characteristic of the file;
      at least one characteristic of at least one application associated with the file;
   a rule-application module programmed to:
      access at least one rule that comprises criteria that identifies acceptable usage behavior for files and applications;
      determine, by applying the rule to both the event of interest and the contextual metadata, whether the event of interest satisfies the criteria that identifies acceptable usage behavior for files and applications;
      determine, based on whether the event of interest satisfies the criteria that identifies acceptable usage behavior for files and applications, whether to perform a security scan on the file.

13. The system of claim 12, wherein the contextual metadata further comprises information that indicates the identity of at least one application that has attempted to access the file.

14. The system of claim 12, wherein the rule further comprises criteria for determining, based on both the event of interest and the contextual metadata, a level of scrutiny to be applied to the file when performing the security scan.

15. The system of claim 12, further comprising a security module programmed to:
   perform the security scan;
   determine, based on results of the security scan, whether to perform a security operation on the file.

16. The system of claim 15, further comprising a metadata-update module programmed to update, based on the results of the security scan, the contextual metadata.

17. A non-transitory computer-readable medium comprising computer-executable instructions that, when executed by a computing device, cause the computing device to:

detect an event of interest;
identify at least one file impacted by the event of interest;
access contextual metadata associated with the event of interest, the contextual metadata comprising information that identifies:
  at least one characteristic of the file;
  at least one characteristic of at least one application associated with the file;
access at least one rule that comprises criteria that identifies acceptable usage behavior for files and applications;
determine, by applying the rule to both the event of interest and the contextual metadata, whether the event of interest satisfies the criteria that identifies acceptable usage behavior for files and applications;
determine, based on whether the event of interest satisfies the criteria that identifies acceptable usage behavior for files and applications, whether to perform a security scan on the file.

18. The non-transitory computer-readable medium of claim 17, wherein the computer-executable instructions, when executed by the computing device, further cause the computing device to:
  perform the security scan on the file;
  determine, based on results of the security scan, whether to perform a security operation on the file.

19. The non-transitory computer-readable medium of claim 18, wherein the computer-executable instructions, when executed by the computing device, further cause the computing device to update the contextual metadata based on the results of the security scan.

* * * * *